(12) United States Patent
Hachisuga et al.

(10) Patent No.: US 10,778,859 B2
(45) Date of Patent: Sep. 15, 2020

(54) IMAGE READING OPTICAL SYSTEM AND IMAGE READING DEVICE

(71) Applicant: FUJI XEROX CO., LTD., Tokyo (JP)

(72) Inventors: Masaki Hachisuga, Kanagawa (JP); Kiyofumi Aikawa, Kanagawa (JP); Takashi Hiramatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/282,310

(22) Filed: Feb. 22, 2019

(65) Prior Publication Data
US 2020/0099813 A1 Mar. 26, 2020

(30) Foreign Application Priority Data
Sep. 25, 2018 (JP) .................................. 2018-179563

(51) Int. Cl.
*H04N 1/04* (2006.01)
*H04N 1/00* (2006.01)
*H04N 1/193* (2006.01)

(52) U.S. Cl.
CPC ..... *H04N 1/00795* (2013.01); *H04N 1/00615* (2013.01); *H04N 1/1936* (2013.01); *H04N 1/1937* (2013.01); *H04N 2201/0081* (2013.01)

(58) Field of Classification Search
CPC ........... H04N 1/00795; H04N 1/00615; H04N 1/1936; H04N 1/1937; H04N 2201/0081
USPC ........ 358/475, 482, 483, 474, 509, 512–514
See application file for complete search history.

(56) References Cited

U.S. PATENT DOCUMENTS

| 6,894,263 B2* | 5/2005 | Fujibayashi | G02B 17/004 |
| | | | 250/208.1 |
| 7,253,928 B2* | 8/2007 | Tochigi | G02B 17/0663 |
| | | | 355/66 |
| 7,760,225 B2* | 7/2010 | Yoshizawa | G03G 15/04036 |
| | | | 347/118 |
| 8,749,864 B2* | 6/2014 | Hayashide | H04N 1/1043 |
| | | | 358/494 |

(Continued)

FOREIGN PATENT DOCUMENTS

| JP | 2004-133197 | 4/2004 |
| JP | 2006-106728 | 4/2006 |

(Continued)

*Primary Examiner* — Cheukfan Lee
(74) *Attorney, Agent, or Firm* — JCIPRNET

(57) ABSTRACT

An image reading optical system includes an image reading portion, multiple light reflection portions, and a diaphragm. The image reading portion includes an array of reading elements that read incident light. The light reflection portions reflect light traveling from a readable object to the image reading portion. The diaphragm regulates light traveling from a first one of the light reflection portions to a subsequent one of the light reflection portions in a specific direction. The diaphragm includes a first light shielding portion and a second light shielding portion disposed at different positions in a travel direction of the light with respect to the first one of the light reflection portions to block part of the light. The first light shielding portion and the second light shielding portion are located in substantially a common plane. The first light shielding portion is disposed along an optical axis of light incident on the first one of the light reflection portions.

15 Claims, 10 Drawing Sheets

(56) References Cited

U.S. PATENT DOCUMENTS

| | | | | |
|---|---|---|---|---|
| 8,755,701 | B2* | 6/2014 | Hyoki | H04N 1/00018 |
| | | | | 399/51 |
| 8,842,343 | B2* | 9/2014 | Ito | G03G 15/5062 |
| | | | | 358/474 |
| 8,922,854 | B2* | 12/2014 | Hyoki | H04N 1/04 |
| | | | | 358/1.9 |
| 2003/0030923 | A1* | 2/2003 | Hsu | G02B 26/126 |
| | | | | 359/857 |
| 2003/0164995 | A1* | 9/2003 | Hsu | H04N 1/03 |
| | | | | 358/509 |
| 2003/0234966 | A1* | 12/2003 | Tochigi | H04N 1/03 |
| | | | | 358/514 |
| 2006/0055987 | A1* | 3/2006 | Tochigi | G02B 17/0621 |
| | | | | 358/474 |
| 2006/0243923 | A1* | 11/2006 | Seki | B82Y 10/00 |
| | | | | 250/493.1 |
| 2007/0241266 | A1* | 10/2007 | Gweon | G02B 21/0032 |
| | | | | 250/225 |
| 2013/0050781 | A1* | 2/2013 | Sasaki | H04N 1/028 |
| | | | | 358/475 |
| 2017/0279999 | A1* | 9/2017 | Hachisuga | H04N 1/02895 |
| 2017/0374223 | A1* | 12/2017 | Aikawa | H04N 1/02825 |
| 2018/0035002 | A1* | 2/2018 | Murase | H04N 1/02835 |
| 2018/0278788 | A1* | 9/2018 | Hiramatsu | H04N 1/0305 |

FOREIGN PATENT DOCUMENTS

| | | | | |
|---|---|---|---|---|
| JP | | 2017161715 A | * | 9/2017 |
| JP | | 2018007104 A | * | 1/2018 |
| JP | | 2018010145 A | * | 1/2018 |

* cited by examiner

FIG. 5
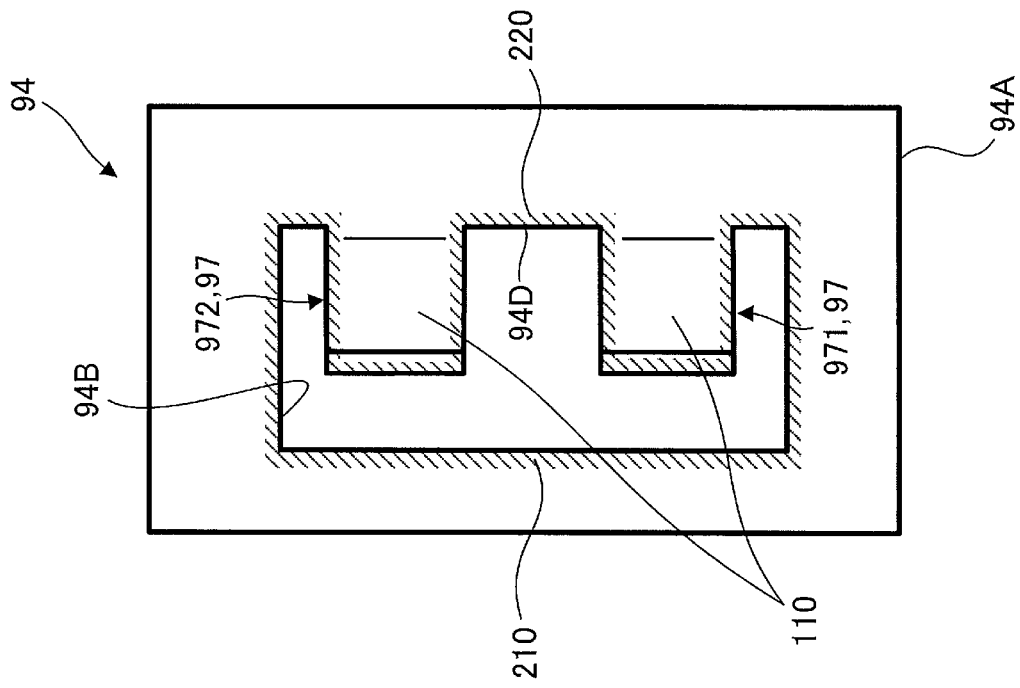
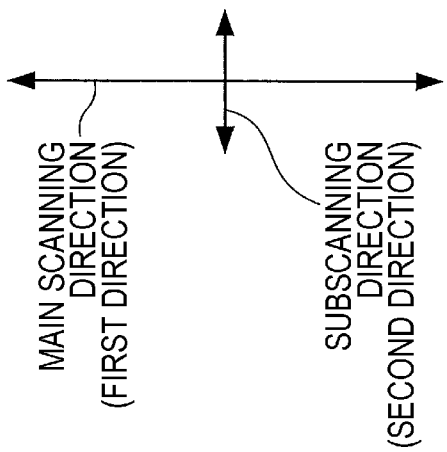

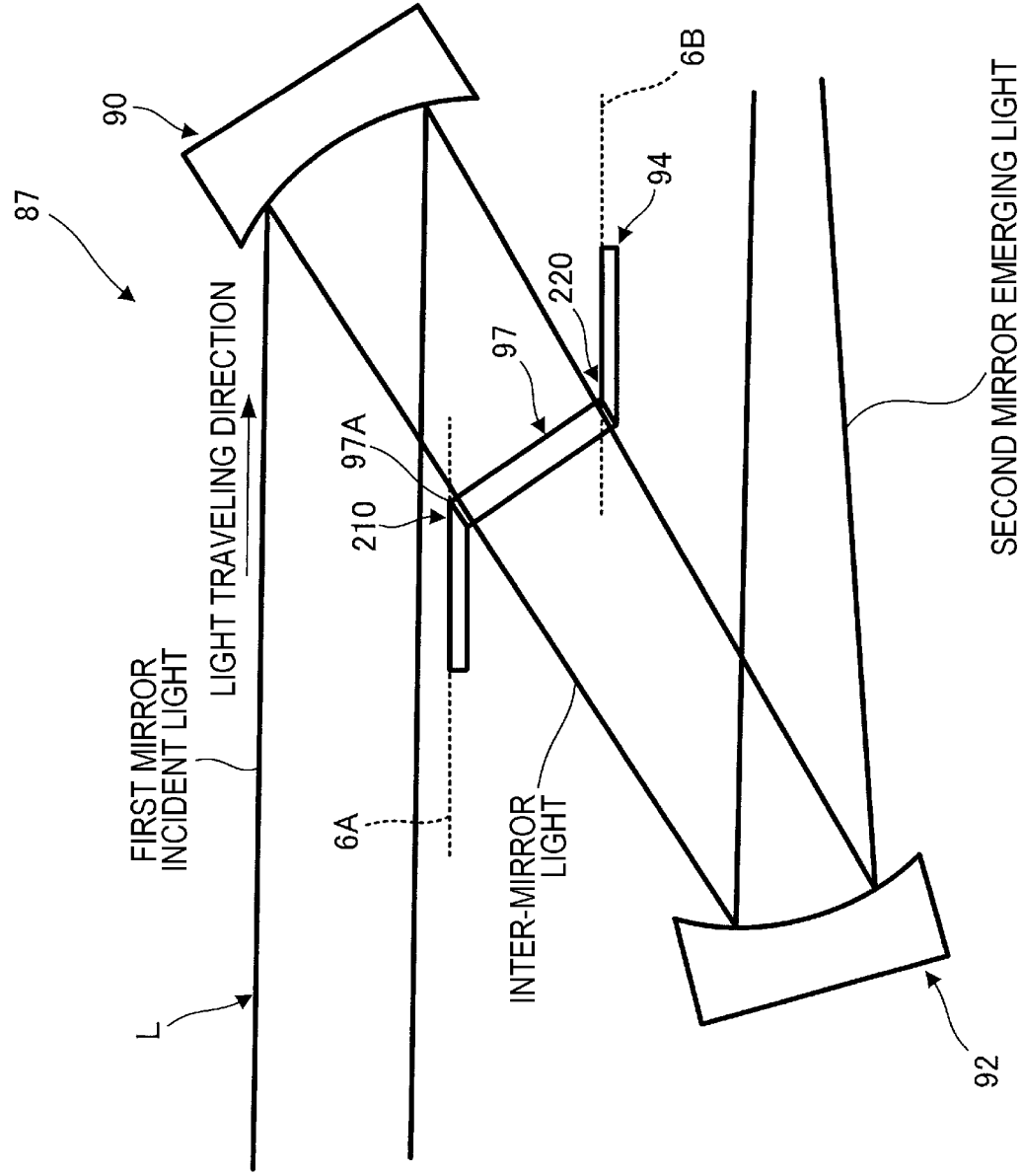

IMAGE READING OPTICAL SYSTEM AND IMAGE READING DEVICE

CROSS-REFERENCE TO RELATED APPLICATIONS

This application is based on and claims priority under 35 USC 119 from Japanese Patent Application No. 2018-179563 filed Sep. 25, 2018.

BACKGROUND

(i) Technical Field

The present disclosure relates to an image reading optical system and an image reading device.

(ii) Related Art

Japanese Patent No. 4497805 discloses an imaging optical system that forms, on a line sensor, an image of image information of an object surface, the imaging optical system including multiple reflection planes in an optical path from the object surface to the line sensor, all the reflection planes being formed of off-axial reflection planes.

Japanese Patent No. 4817773 discloses an imaging optical system including two off-axial optical devices.

Some optical systems that read images regulate light using, for example, a light shielding portion for light reduction.

In an optical system that reflects light with multiple light reflection portions and forms images with light on an image reading portion (sensor), if the light shielding portions serving as diaphragms are arranged in the plane orthogonal to the optical axis or if regulating members for regulating light are arranged in the direction orthogonal to the optical axis direction, the light shielding portions or the regulating members easily block light beams on other optical paths reflected by the light reflection portions. To avoid this, the other optical paths need to be spaced apart from the light shielding portions or regulating members. This arrangement, however, is more likely to enlarge bend angles of the optical paths.

The present disclosure aims to further narrow down a bend angle between a first optical path, along which light travels to be incident on a light reflection portion, and a second optical path, along which light emerges, compared to a case where multiple light shielding portions which regulate light and serve as optical diaphragms are arranged in an optical axis direction.

SUMMARY

Aspects of non-limiting embodiments of the present disclosure relate to an image reading optical system that includes an image reading portion, multiple light reflection portions, and a diaphragm. The image reading portion includes an array of reading elements that read incident light. The light reflection portions reflect light traveling from a readable object to the image reading portion. The diaphragm regulates light traveling from a first one of the light reflection portions to a subsequent one of the light reflection portions in a specific direction. The diaphragm includes a first light shielding portion and a second light shielding portion disposed at different positions in a travel direction of the light with respect to the first one of the light reflection portions to block part of the light. The first light shielding portion and the second light shielding portion are located in substantially a common plane. The first light shielding portion is disposed along an optical axis of light incident on the first one of the light reflection portions.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

BRIEF DESCRIPTION OF THE DRAWINGS

Exemplary embodiments of the present disclosure will be described in detail based on the following figures, wherein:

FIG. 5 illustrates a diaphragm member, viewed in the direction of arrow V in FIG. 3;

FIG. 6 illustrates another structure example;

DETAILED DESCRIPTION

Exemplary embodiments of the present disclosure will now be described below with reference to the appended drawings.

Figure 1:
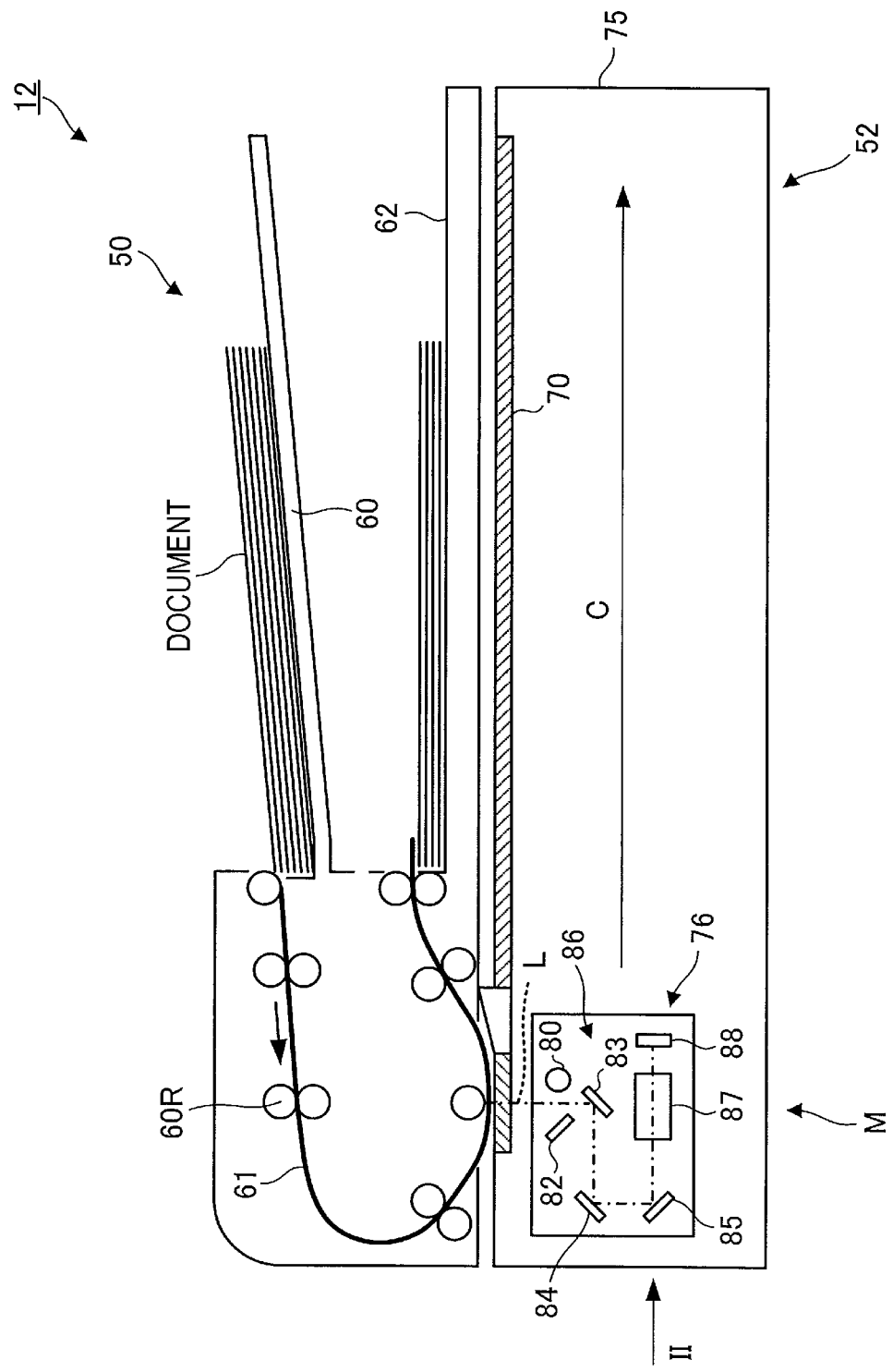
FIG. 1 illustrates an image reading device.

FIG. 1 illustrates an image reading device 12 according to an exemplary embodiment.

The image reading device 12 includes a document feeder 50, and an image reading processor 52, which reads images on documents.

The document feeder 50 includes a document tray 60, which receives documents, a document transport path 61, along which documents are transported, and a discharging portion 62, to which documents from which images are read are discharged.

The document transport path 61 has a letter U shape.

On the document transport path 61, multiple document transport rollers 60R are arranged. Documents placed on the document tray 60 are transported along the document transport path 61 by the multiple document transport rollers 60R. Documents transported along the document transport path 61 are finally discharged to the discharging portion 62.

The image reading device 12 has a function of reading images of documents transported thereto from the document feeder 50, and a function of reading images of documents placed on a platen glass 70, described later.

The image reading processor 52 includes a housing 75, and the platen glass 70, at an upper portion of the housing 75. In the present exemplary embodiment, documents are manually placed on the platen glass 70 one by one by an operator.

The housing 75 accommodates a reader unit 76 (carriage), which reads images on documents.

The reader unit 76 is movable along the platen glass 70.

The reader unit 76 is disposed in a read position M to read images on documents transported by the document feeder 50 and passing over the reader unit 76.

The reader unit 76 moves along the platen glass 70 to read images on documents placed on the platen glass 70.

The reader unit 76 includes an illumination unit 80, which is an example of a light source. The illumination unit 80 emits light to documents, which are readable objects.

The reader unit 76 also includes an image reading optical system 86.

In the present exemplary embodiment, the image reading optical system 86 includes a mirror 83, a mirror 84, and a mirror 85, which reflect reflected light L from the documents.

In the present exemplary embodiment, the image reading optical system 86 includes an imaging unit 87, and a sensor 88, which is an example of an image reading portion.

The imaging unit 87 is disposed downstream of the mirror 85 in the travel direction of the reflected light L.

The illumination unit 80 includes, for example, a white light emitting diode (LED).

The present exemplary embodiment includes a reflecting member 82, which reflects light emitted from the illumination unit 80 toward the documents.

The imaging unit 87 shapes a beam (optical image) of the reflected light L from the document into the shape appropriately receivable by the sensor 88. The imaging unit 87 may include an imaging lens (not illustrated) that optically reduces the size of the reflected light L from the document (an optical image of the document).

The sensor 88 photoelectrically converts the optical image that has passed through the imaging unit 87, and creates signals (image signals) for red (R), green (G), and blue (B).

Figure 2:
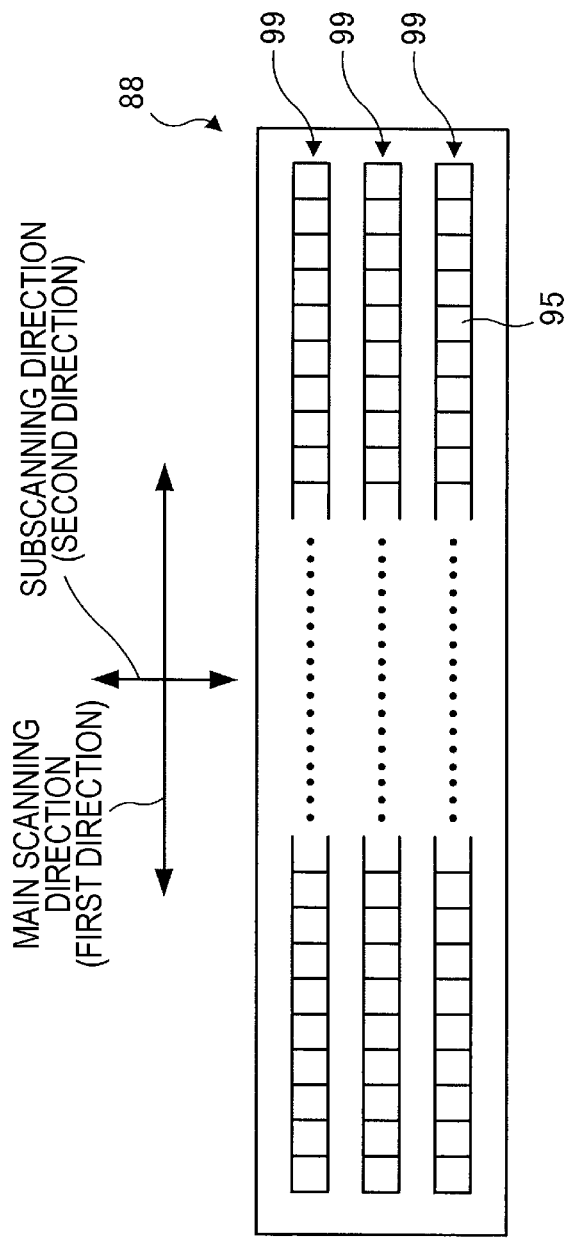
FIG. 2 illustrates a sensor, viewed in the direction of arrow II in FIG. 1.

FIG. 2 illustrates the sensor 88, viewed in the direction of arrow II of FIG. 1.

The sensor 88 is formed of, for example, a CCD image sensor.

As illustrated in FIG. 2, the sensor 88 includes three one-dimensional line sensors 99, each extending in a main scanning direction (a first direction).

These three one-dimensional line sensors 99 are arranged side by side in a subscanning direction, or a second direction crossing (orthogonal to) the first direction.

More specifically, in the present exemplary embodiment, the three one-dimensional line sensors 99 are disposed for the respective colors R, G, and B.

Each one-dimensional line sensor 99 includes multiple reading elements (image sensors) 95, arranged side by side in the main scanning direction (first direction). In other words, each one-dimensional line sensor 99 includes an array of the reading elements 95 that receive incident light.

Herein, the direction in which the reading elements 95 are arranged refers to the direction in which the reading elements 95 of each one-dimensional line sensor 99 for the corresponding color are arranged. In other words, the direction in which the reading elements 95 are arranged refers to the main scanning direction.

More specifically, in the present exemplary embodiment, three one-dimensional line sensors 99 are also arranged side by side in the subscanning direction, so that the three reading elements 95 are also arranged side by side in the subscanning direction. However, herein, the direction in which the reading elements 95 are arranged refers to the main scanning direction.

In other words, herein, the main scanning direction corresponding to the direction in which the reading elements 95 are arranged refers to the direction in which the reading elements 95 in each one-dimensional line sensor 99 for the corresponding color are arranged, and the subscanning direction refers to the direction crossing (orthogonal to) the direction in which the reading elements 95 are arranged.

In the present exemplary embodiment, to read a document on the platen glass 70, a controller, not illustrated, moves the reader unit 76 in the direction of arrow C in FIG. 1.

Here, reflected light L from the document travels to the sensor 88 via the mirror 83, the mirror 84, the mirror 85, and the imaging unit 87, so that the sensor 88 reads the document.

Then, in the present exemplary embodiment, when the reader unit 76 reaches the position opposing the end of the document, the reader unit 76 finishes reading of one page of the document.

To read the document transported by the document feeder 50, the reader unit 76 is positioned in the read position M.

In this state, the document feeder 50 starts transporting a document, and the document passes over the reader unit 76. At this time, as in the above case, reflected light L from the document travels to the sensor 88 via the mirror 83, the mirror 84, the mirror 85, and the imaging unit 87, and then, the sensor 88 reads the document.

Here, a reading optical system including a combination of multiple reflection optical systems having power (intensity for bending light) in a predetermined direction may be used as an optical system that shapes the reflected light L from the document. The reading optical system including a combination of multiple reflection optical systems inevitably causes a reflected optical path.

The reading optical system includes a diaphragm for the purposes of, for example, adjusting the light amount, adjusting the modulated transfer function (MTF) or the transfer function of the optical system, or increasing the depth of focus.

This diaphragm condenses light in both a longitudinal direction of the sensor 88 (in the direction in which the reading elements 95 are arranged, or the main scanning direction) and in a lateral direction (in the direction orthogonal to the direction in which the reading elements 95 are arranged, or the subscanning direction).

Figure 3:
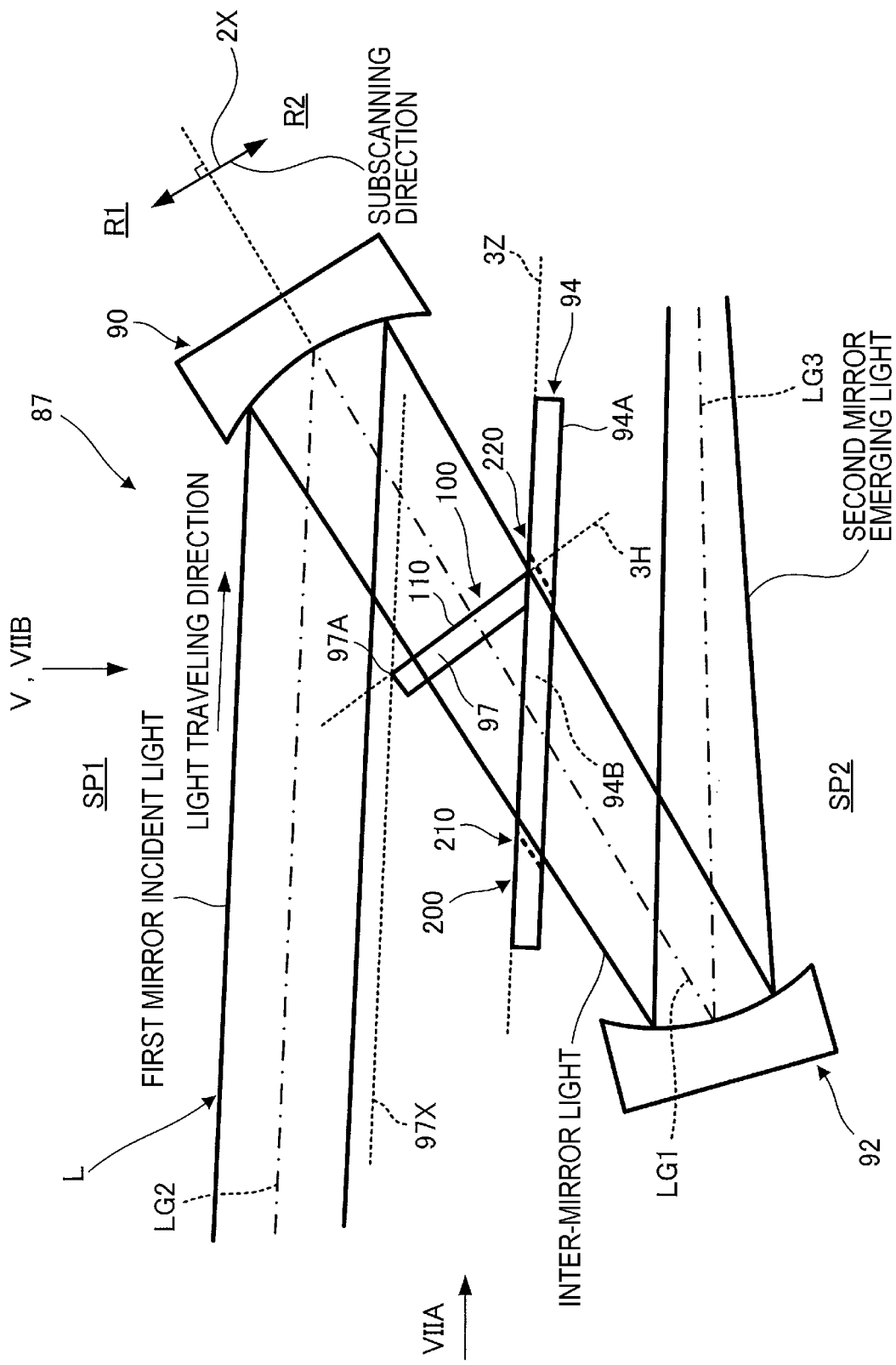
FIG. 3 illustrates the structure of an imaging unit.

FIG. 3 illustrates the structure of the imaging unit 87.

The imaging unit 87 includes a first imaging mirror 90, and a second imaging mirror 92. The first imaging mirror 90 and the second imaging mirror 92 reflect the reflected light L from the document, which is a readable object.

In other words, the imaging unit 87 includes multiple light reflection portions that reflect the reflected light L traveling to the sensor 88, which is an example of an image reading portion. Each of the multiple light reflection portions reflects the reflected light L from the document.

In the present exemplary embodiment, the first imaging mirror 90, which is an example of one of the light reflection portions, reflects the reflected light L, first, and then the second imaging mirror 92, which is a subsequent one of the light reflection portions, reflects the reflected light L.

The first imaging mirror 90 and the second imaging mirror 92 are concave mirrors, and have a function of reflecting the reflected light L, and a function of condensing the reflected light L.

Thus, in the present exemplary embodiment, light beams from the first imaging mirror 90 and the second imaging mirror 92 have their width (width in both the main scanning direction and the subscanning direction) gradually tapering downstream in the light travel direction.

The present exemplary embodiment also includes a diaphragm member 94 between the first imaging mirror 90 and the second imaging mirror 92.

The diaphragm member 94 blocks part of the reflected light L reflected by the first imaging mirror 90, and regulates the reflected light L in the main scanning direction and the subscanning direction.

The diaphragm member 94 includes a first diaphragm 100, which regulates the reflected light L in the main scanning direction (first direction). In other words, the diaphragm member 94 includes a first diaphragm 100, which regulates the reflected light L in the direction the same as the direction in which the reading elements 95 are arranged.

The diaphragm member 94 also includes a second diaphragm 200, which regulates the reflected light L in the subscanning direction (in the second direction crossing the first direction).

More specifically, the diaphragm member 94 includes a second diaphragm 200, which regulates the reflected light L in the direction crossing (orthogonal to) the direction in which the reading elements 95 are arranged.

More specifically, the first diaphragm 100 includes a light receiving surface 110, which receives part of the reflected light L traveling from the first imaging mirror 90 to the second imaging mirror 92 (hereinafter referred to as "inter-mirror light"). The light receiving surface 110 blocks part of the inter-mirror light to regulate the inter-mirror light in the main scanning direction.

The second diaphragm 200, including a first light shielding portion 210 and a second light shielding portion 220, blocks part of the inter-mirror light with the first light shielding portion 210 and the second light shielding portion 220, and regulates the inter-mirror light in the subscanning direction.

The diaphragm member 94 includes a plate member 94A, formed of a flat plate.

The plate member 94A is disposed at an angle with respect to the inter-mirror light travel direction and to cross the inter-mirror light.

In the present exemplary embodiment, part of the plate member 94A functions as the first light shielding portion 210 and the second light shielding portion 220, and the plate member 94A regulates the inter-mirror light.

The plate member 94A has an opening 94B, through which the inter-mirror light passes.

In the present exemplary embodiment, a portion of the plate member 94A around the opening 94B regulates the inter-mirror light.

More specifically, in the present exemplary embodiment, portions of the plate member 94A around the opening 94B serve as the first light shielding portion 210 and the second light shielding portion 220.

The first light shielding portion 210 and the second light shielding portion 220, located around the opening 94B, block part of the inter-mirror light, so that the inter-mirror light is regulated in the subscanning direction, which is an example of a specific direction.

More specifically, in the present exemplary embodiment, a portion of the plate member 94A located on the left side of the opening 94B in the drawing serves as the first light shielding portion 210, and a portion of the plate member 94A located on the right side of the opening 94B in the drawing serves as the second light shielding portion 220.

In the present exemplary embodiment, the first light shielding portion 210 and the second light shielding portion 220 block part of the inter-mirror light to condense the inter-mirror light.

The first light shielding portion 210 and the second light shielding portion 220 are disposed at different positions in the inter-mirror light travel direction with respect to the first imaging mirror 90.

More specifically, in the present exemplary embodiment, the first light shielding portion 210 and the second light shielding portion 220 are in different positions in the inter-mirror light travel direction.

In the present exemplary embodiment, the first light shielding portion 210 is located downstream of the second light shielding portion 220 in the inter-mirror light travel direction.

Figure 4:
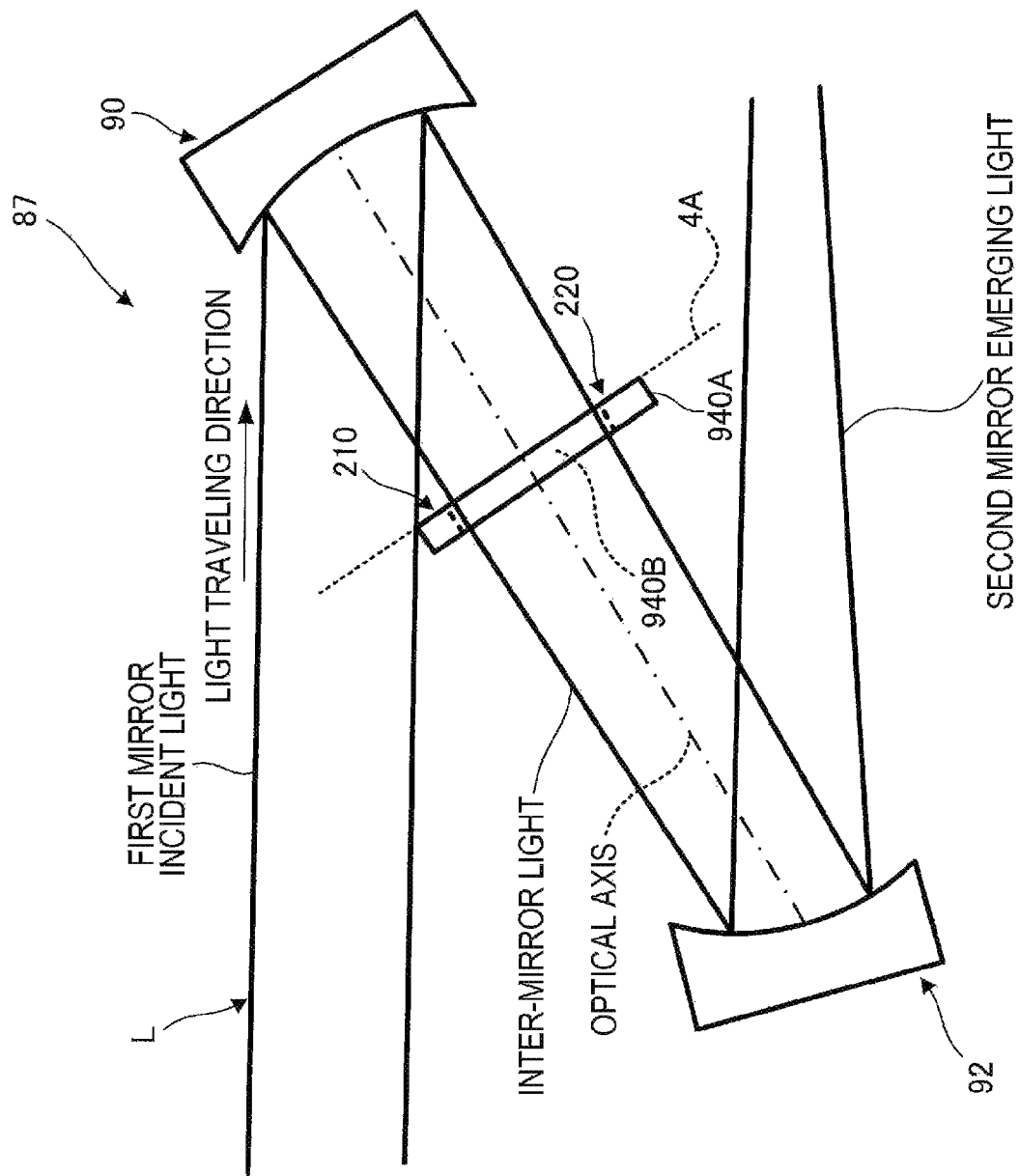
FIG. 4 illustrates a comparative example of an imaging unit.

FIG. 4 illustrates a comparative example of the imaging unit 87.

In this comparative example, a plate member 940A having a rectangular opening 940B is disposed to extend in the direction orthogonal to the inter-mirror light travel direction. In other words, the plate member 940A is disposed orthogonal to the optical axis of the inter-mirror light.

Furthermore, in this comparative example, the first light shielding portion 210 and the second light shielding portion 220 are disposed in a plane 4A orthogonal to the optical axis of the inter-mirror light.

In this comparative example, the plate member 940A is more likely to interfere with the incident light that is incident on the first imaging mirror 90 (hereinafter referred to as "first mirror incident light") or the emerging light that emerges from the second imaging mirror 92 (hereinafter referred to as "second mirror emerging light").

To avoid this interference, the optical path of the first mirror incident light or the optical path of the second mirror emerging light needs to be spaced apart from the plate member 940A. This structure is more likely to enlarge the bend angles of the optical paths, and thus enlarge the reader unit 76 (refer to FIG. 1).

On the other hand, in the present exemplary embodiment (as illustrated in FIG. 3) in which the plate member 94A is disposed at an angle with respect to the inter-mirror light travel direction, the plate member 94A is less likely to interfere with the first mirror incident light or the second mirror emerging light.

More specifically, in the present exemplary embodiment, the first light shielding portion 210 and the second light shielding portion 220 are located at different positions in the inter-mirror light travel direction. Thus, the plate member 94A is less likely to interfere with the first mirror incident light or the second mirror emerging light.

In the present exemplary embodiment, the first light shielding portion 210 and the second light shielding portion 220 are formed of a single unit.

More specifically, in the present exemplary embodiment, the first light shielding portion 210 and the second light shielding portion 220 are formed of portions of the plate member 94A, or the first light shielding portion 210 and the second light shielding portion 220 are formed of a common member.

In the present exemplary embodiment, the first light shielding portion 210 is located closer to the optical path of the first mirror incident light than the second light shielding portion 220.

More specifically, in the present exemplary embodiment, as illustrated in FIG. 3, the first light shielding portion 210 is located in, among two areas R1 and R2 opposing each other with an optical axis LG1 of the inter-mirror light interposed therebetween, the area R1, closer to the first mirror incident light, and the second light shielding portion 220 is located in the area R2, further from the first mirror incident light.

More specifically, the first light shielding portion 210 is located closer to the optical path of the first mirror incident light than the second light shielding portion 220 in the direction orthogonal to the optical axis LG1 of the inter-mirror light, which is the subscanning direction (in the direction of arrow 2X).

In the present exemplary embodiment, the distance between the first light shielding portion 210 and the first imaging mirror 90 is greater than the distance between the second light shielding portion 220 and the first imaging mirror 90.

In a structure, for example, where the distance between the first light shielding portion 210 and the first imaging mirror 90 is smaller than the distance between the second light shielding portion 220 and the first imaging mirror 90 and the first light shielding portion 210 is located upstream of the second light shielding portion 220, the plate member 94A (a portion of the plate member 94A including the first light shielding portion 210) is more likely to interfere with the first mirror incident light.

On the other hand, as in the present exemplary embodiment, in the structure where the distance between the first light shielding portion 210 and the first imaging mirror 90 is greater than the distance between the second light shielding portion 220 and the first imaging mirror 90, the plate member 94A (a portion of the plate member 94A including the first light shielding portion 210) is less likely to interfere with the first mirror incident light.

In the plate member 94A, the distance from the first light shielding portion 210 to the end of the plate member 94A closer to the first light shielding portion 210 may be shorter than the distance from the second light shielding portion 220 to the end of the plate member 94A closer to the second light shielding portion 220. In this structure, the plate member 94A (a portion of the plate member 94A including the first light shielding portion 210) is less likely to interfere with the first mirror incident light.

In the present exemplary embodiment, the plate member 94A is disposed along an optical axis LG2 of the first mirror incident light. Thus, the plate member 94A is less likely to interfere with the first mirror incident light than in the case where the plate member 94A is not disposed along the optical axis LG2 of the first mirror incident light.

Alternatively, the plate member 94A may be disposed along an optical axis LG3 of the second mirror emerging light.

The plate member 94A may be disposed along both the optical axis LG2 of the first mirror incident light and the optical axis LG3 of the second mirror emerging light.

In this case, the optical axis LG3 of the second mirror emerging light extends along the optical axis LG2 of the first mirror incident light, and the plate member 94A extends along these optical axes LG2 and LG3.

FIG. 5 illustrates the diaphragm member 94, viewed in the direction of arrow V in FIG. 3.

As described above, the diaphragm member 94 has the rectangular plate member 94A. The plate member 94A has a rectangular opening 94B.

In the present exemplary embodiment, the inter-mirror light passes through the opening 94B in the plate member 94A.

In the present exemplary embodiment, part of the plate member 94A around the opening 94B regulates the inter-mirror light in the subscanning direction, which is an example of a specific direction.

More specifically, in the present exemplary embodiment, a portion of the plate member 94A located on the left of the opening 94B in the drawing serves as the first light shielding portion 210, and a portion of the plate member 94A located on the right of the opening 94B in the drawing serves as the second light shielding portion 220.

In the present exemplary embodiment, the first light shielding portion 210 and the second light shielding portion 220 regulate the inter-mirror light in the subscanning direction, which is an example of a specific direction.

Here, regulating light in a specific direction refers to blocking passage of an end portion of a beam, that is, an end portion of light in the specific direction. In other words, regulating light in a specific direction refers to preventing a beam from expanding in the specific direction.

The present exemplary embodiment includes projections 97, which project into the opening 94B from an opening edge 94D of the opening 94B.

More specifically, in the present exemplary embodiment, as illustrated in FIG. 5, when the opening 94B (plate member 94A) is viewed from the front, the projections 97 project into the opening 94B from the opening edge 94D of the opening 94B.

As described above, the present exemplary embodiment includes the first diaphragm 100 (refer to FIG. 3), which regulates the inter-mirror light in the main scanning direction. The first diaphragm 100 includes the projections 97.

As illustrated in FIG. 3, the projections 97 project toward the optical path of the inter-mirror light from the side of the optical path. The projections 97 are formed of plate-shaped projecting pieces.

In the present exemplary embodiment, as illustrated in FIG. 5, the projections 97 include a first projection 971 and a second projection 972. The first projection 971 and the second projection 972 are disposed at different positions in the main scanning direction.

The first projection 971 and the second projection 972 are disposed while having a gap therebetween.

The first projection 971 and the second projection 972 are integrated with each other with the plate member 94A.

The first projection 971 and the second projection 972 block part of the inter-mirror light beam passing an end portion in the main scanning direction to regulate the inter-mirror light.

More specifically, the first projection 971 and the second projection 972 each include a light receiving surface 110, which blocks part of the inter-mirror light to regulate the inter-mirror light.

In the present exemplary embodiment, as illustrated in FIG. 3, when an end pass plane 97X that passes free end portions 97A of the projections 97 is assumed, the first light shielding portion 210 and the second light shielding portion 220 are located closer to the base of the projections 97 (the junction between the projections 97 and the plate member 94A) than the end pass plane 97X.

More specifically, an end pass plane 97X that passes the free end portions 97A of the projections 97 and extends along the optical axis LG2 of the incident light incident on the first mirror is assumed, and a first space SP1 and a second space SP2, which are two opposing spaces with the end pass plane 97X interposed therebetween, are assumed.

In this case, of these two spaces SP1 and SP2, the first light shielding portion 210 and the second light shielding portion 220 are located in the second space SP2 in which the bases of the projections 97 are located.

As illustrated in FIG. 6 (illustrating another structure example), a structure in which a portion corresponding to the first light shielding portion 210 is connected to the end portions 97A of the projections 97 is also conceivable. In other words, a plane 6A in which the first light shielding portion 210 is located and a plane 6B in which the second light shielding portion 220 is located may be different from each other.

In this structure, the first light shielding portion 210 is disposed closer to the first mirror incident light. Thus, compared to the structure according to the exemplary embodiment illustrated in FIG. 3, the reflected light L (first mirror incident light) and the diaphragm member 94 are more likely to interfere with each other.

In contrast, in the structure example according to the exemplary embodiment illustrated in FIG. 3, the first light shielding portion 210 and the second light shielding portion 220 are located in a common plane 3Z, which is at an angle with respect to the optical axis LG1 of the inter-mirror light. Here, the common plane 3Z may also refer to substantially common planes, instead of only a completely common plane. The plane in which the second light shielding portion 220 is located may be parallel to and slightly spaced apart from the extension of the plane of the first light shielding portion 210, or may not be completely parallel to the plane in which the first light shielding portion 210 is located and may cross the plane at a small angle.

In this case, the first light shielding portion 210 is apart from the first mirror incident light, so that the reflected light L (first mirror incident light) and the diaphragm member 94 are less likely to interfere with each other.

More specifically, in the structure example illustrated in FIG. 6, the light shielding portions (the first light shielding portion 210 and the second light shielding portion 220) are connected to base portions and the end portions 97A of the projections 97.

In contrast, in the structure example illustrated in FIG. 3, the first light shielding portion 210 is not connected to the end portions 97A of the projections 97, and the first light shielding portion 210 is located closer to the second mirror emerging light.

In the structure example illustrated in FIG. 3, when a plane 3H passing the light receiving surface 110 is assumed, the first light shielding portion 210 is located apart from the plane 3H, instead of being located in the plane 3H.

More specifically, the first light shielding portion 210 is located, in the inter-mirror light travel direction, downstream of the plane 3H and apart from the plane 3H.

In the structure example illustrated in FIG. 3, the common plane 3Z, in which the first light shielding portion 210 and the second light shielding portion 220 are located, crosses the plane 3H that passes the light receiving surface 110 of the first diaphragm 100.

Figure 7A:
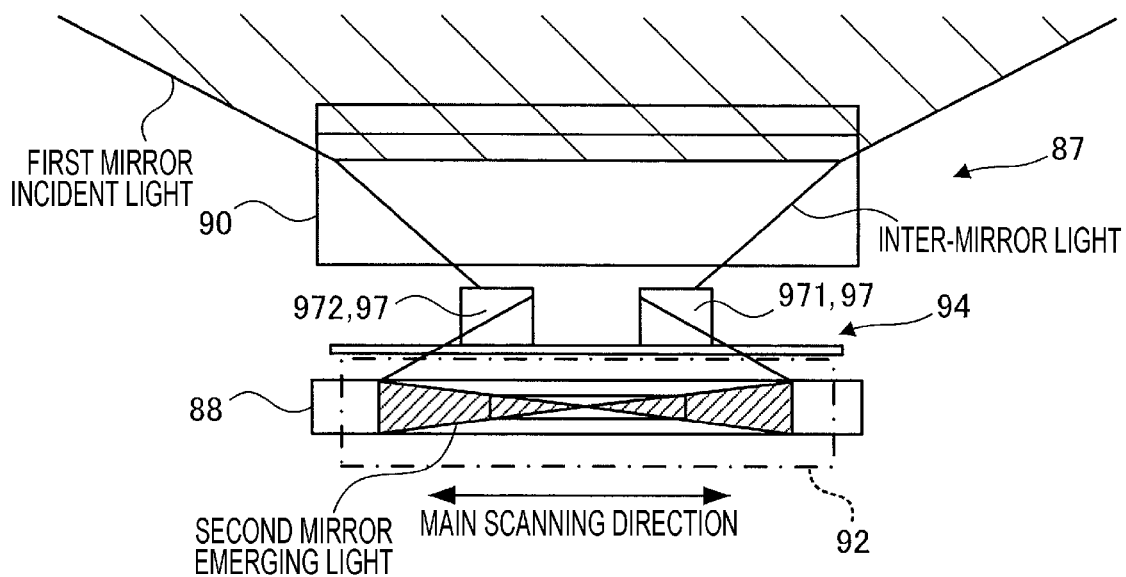
FIG. 7A illustrates an imaging unit, viewed in the direction of arrow VIIA of FIG. 3.
Figure 7B:
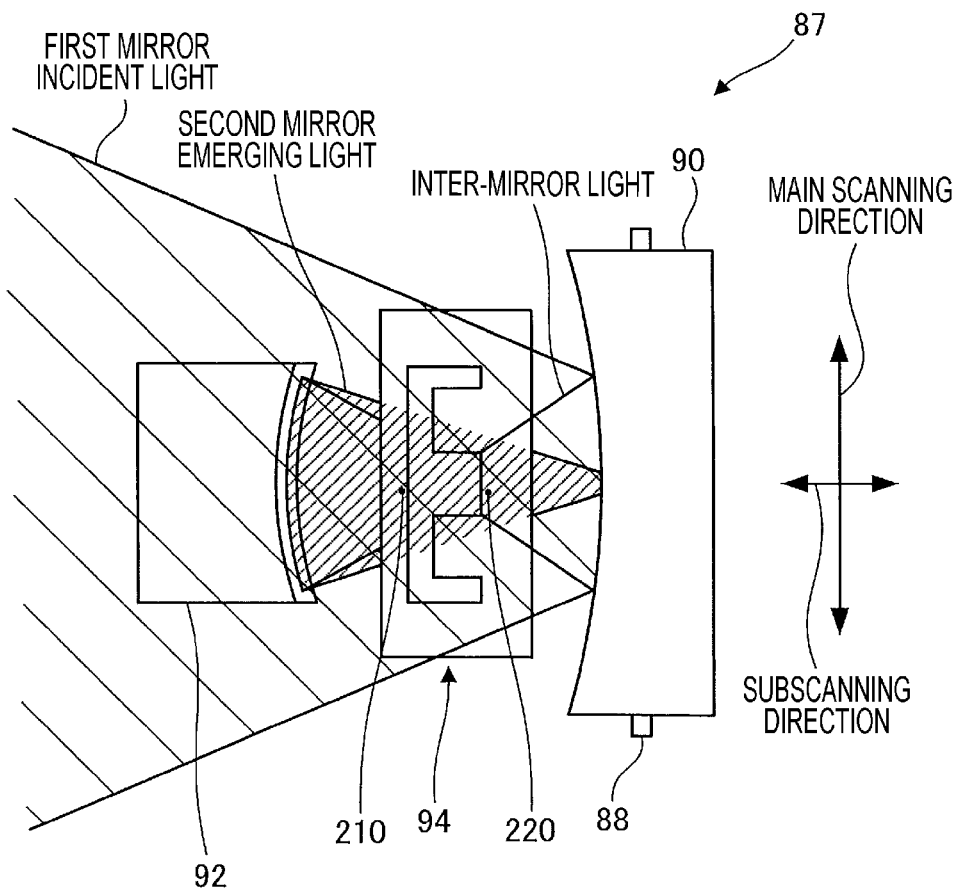
FIG. 7B illustrates an imaging unit, viewed in the direction of arrow VIIB of FIG. 3.

FIG. 7A illustrates the imaging unit 87, when viewed in the direction of arrow VIIA of FIG. 3, and FIG. 7B illustrates the imaging unit 87, when viewed in the direction of arrow VIIB of FIG. 3.

In the present exemplary embodiment, as illustrated in FIG. 7A, inter-mirror light occurs when the first mirror incident light is reflected by the first imaging mirror 90.

In the present exemplary embodiment, the first projection 971 and the second projection 972 in the diaphragm member 94 regulate the inter-mirror light in the main scanning direction.

In the present exemplary embodiment, as illustrated in FIG. 7B, the first light shielding portion 210 and the second light shielding portion 220 of the diaphragm member 94 regulate the inter-mirror light in the subscanning direction.

The present exemplary embodiment includes two projections 97, that is, the first projection 971 and the second projection 972. However, this is not the only possible structure. For example, only one of the projections 97 may be disposed in accordance with, for example, the state of light (beam) that is to be regulated.

Similarly, only one of the first light shielding portion 210 and the second light shielding portion 220 may be disposed in accordance with, for example, the state of light (beam) that is to be regulated.

In the present exemplary embodiment, a structure in which the opening 94B in the plate member 94A is rectangular is described by way of example. However, this is not the only possible structure. The opening 94B may have another shape such as circular, elliptic, or triangular in accordance with, for example, a cross-sectional shape of a beam of the reflected light L.

Figure 8A:
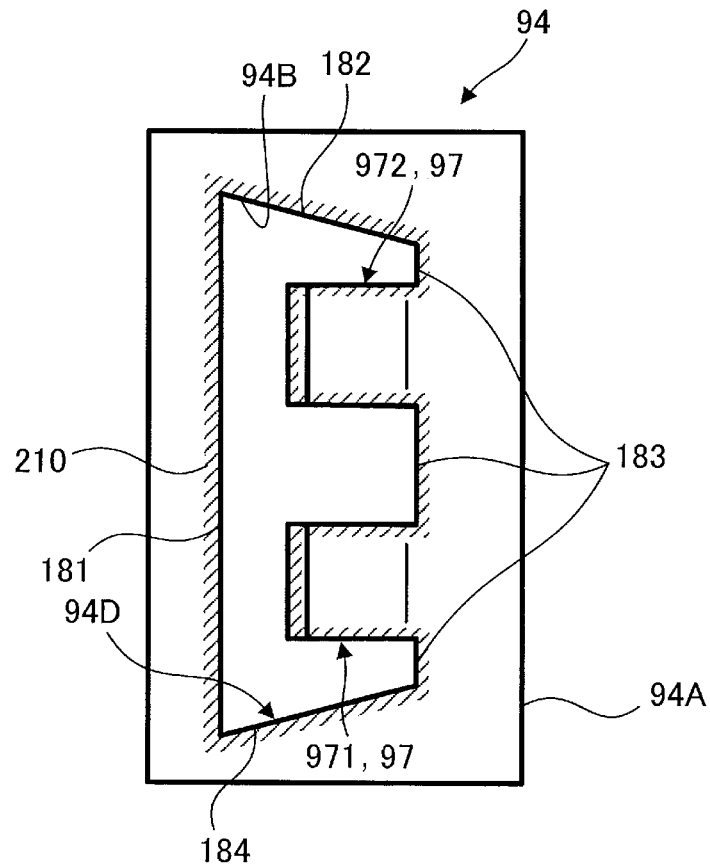
FIGS. 8A and 8B illustrate another structure of a diaphragm member.

FIG. 8A (illustrating another structure example of the diaphragm member 94) illustrates a trapezoidal opening 94B in the plate member 94A, by way of example.

In this structure example, of a first side 181 to a fourth side 184 located at the opening edge 94D, the first side 181, corresponding to the lower base, is longer than a third side 183, corresponding to the upper base.

Figure 8B:
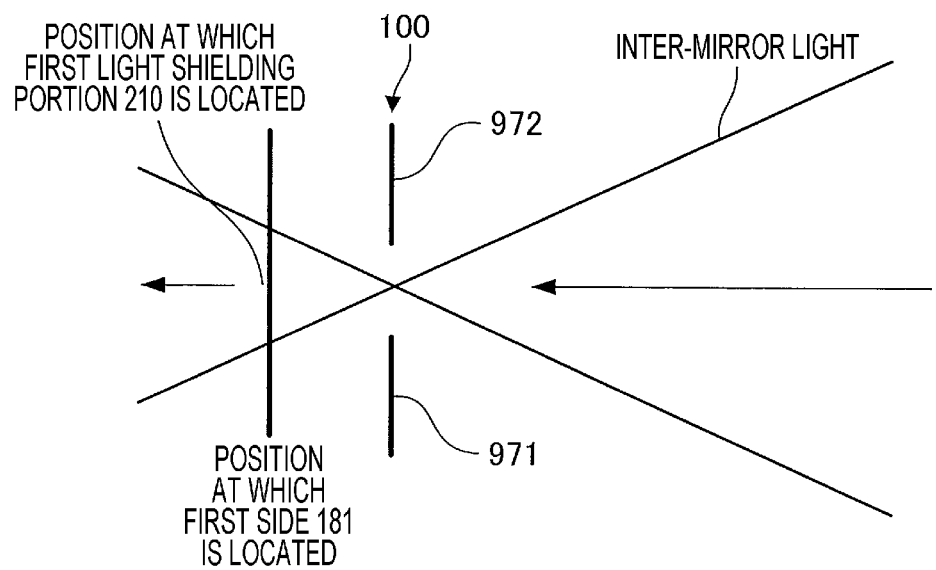

In the present exemplary embodiment, as illustrated in FIG. 8B, the width of the inter-mirror light beam gradually increases at a position downstream of the first diaphragm 100.

Here, when the first side 181 corresponding to the lower base is longer than the third side 183 corresponding to the upper base, the inter-mirror light and the plate member 94A are less likely to interfere with each other than in the case where the first side 181 is not longer than the third side 183.

Figure 10A:
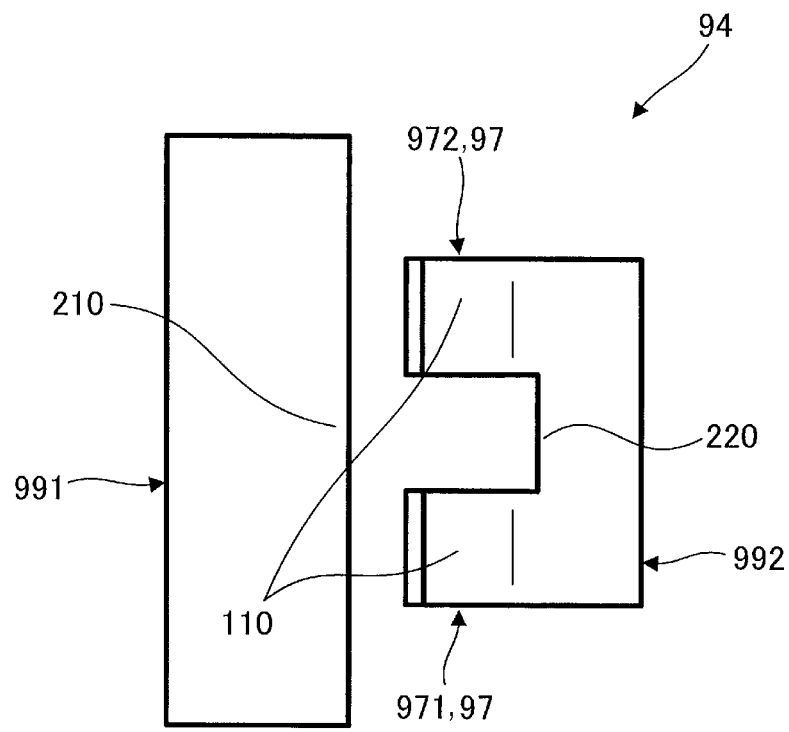
FIGS. 10A and 10B illustrate another structure example of a diaphragm member.
Figure 10B:
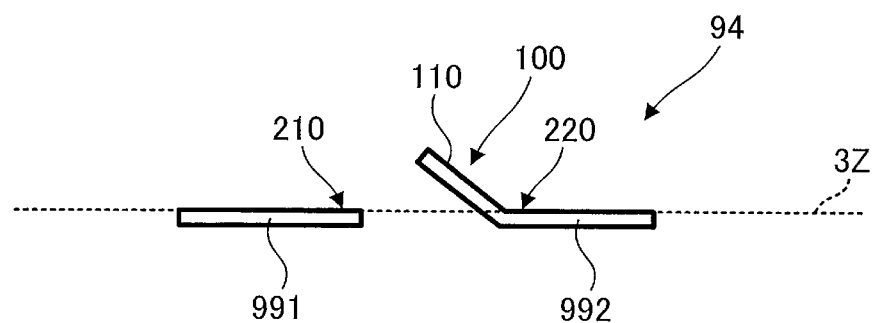

In the present exemplary embodiment, the case where the first light shielding portion 210 and the second light shielding portion 220 are formed of the common plate member 94A is described. However, this is not the only possible structure. As illustrated in FIGS. 10A and 10B (illustrating another structure example of the diaphragm member 94), the first light shielding portion 210 and the second light shielding portion 220 may be formed of plate members 991 and 992, which are separate (separate members).

As in the above case, the first light shielding portion 210 and the second light shielding portion 220 (plate members 991 and 992) are located on the common plane 3Z.

Thus far, a structure in which the first imaging mirror 90 and the second imaging mirror 92 (concave mirrors) that have power in a predetermined direction (or in both the main scanning direction and the subscanning direction) are used as reflecting mirrors is described by way of example. However, this is not the only possible structure. For example, plane mirrors may be used, instead.

When imaging mirrors having power in a predetermined direction are used as the first imaging mirror 90 and the second imaging mirror 92, the imaging mirrors may have power in only either the main scanning direction or the subscanning direction. Alternatively, the imaging mirrors may have power in both the main scanning direction and the subscanning direction.

Both of or either one of the first imaging mirror 90 and the second imaging mirror 92 may have power.

In the exemplary embodiments, a structure example including two imaging mirrors (the first imaging mirror 90 and the second imaging mirror 92) is described. However, this is not the only possible structure. The structure may include three or more imaging mirrors.

The imaging mirrors may be formed from resin such as plastics and formed by depositing metal on a curved surface. Instead of resin, the imaging mirrors may be formed from glass or metal.

Mirrors having positive power (condensing optical systems) need to be disposed in front of and at the back of the diaphragm. Between the mirrors, negative power (magnifying optical system) may be disposed.

It will suffice that at least an optical system or a group of optical systems that has positive power in total is disposed in front of the diaphragm (on the upstream side of the optical path), and an optical system or a group of optical systems that has positive power in total is disposed at the back of the diaphragm (on the downstream side of the optical path).

Figure 9:
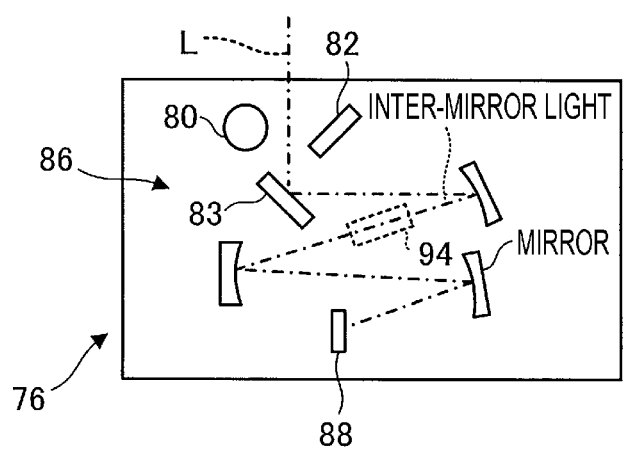
FIG. 9 illustrates another structure example of a reader unit.

The reader unit 76 may have a structure illustrated in FIG. 9 (illustrating another structure example of the reader unit 76).

In the structure example illustrated in FIG. 1, the reflected light L travels to the sensor 88 from the left side of the sensor 88 in FIG. 1. However, in the structure illustrated in FIG. 9, after the reflected light L is reflected by multiple mirrors, the reflected light L travels to the sensor 88 from the right side of the sensor 88 in FIG. 1.

Although not illustrated in detail, the structure example illustrated in FIG. 9 also includes the diaphragm member 94 that regulates the inter-mirror light, as in the above case.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading optical system, comprising:
a sensor including an array of reading elements that read incident light;
a plurality of imaging mirrors that reflect light traveling from a readable object to the sensor;
a first diaphragm that regulates light traveling from a first one of the imaging mirrors to a subsequent one of the imaging mirrors in a specific direction, the first diaphragm including a first light shielding portion and a second light shielding portion disposed at different positions in a travel direction of the light with respect to the first one of the imaging mirrors to block part of the light, the first light shielding portion and the second light shielding portion being located in substantially a common plane,
wherein the first light shielding portion is disposed along an optical axis of light incident on the first one of the imaging mirrors; and
a second diaphragm that has a light receiving surface that receives part of light traveling from the first one of the imaging mirrors to the subsequent one of the imaging mirrors to regulate the light in a direction crossing the specific direction,
wherein at least one of the first and second light shielding portions deviates from a plane passing the light receiving surface.

2. The image reading optical system according to claim 1, wherein the first light shielding portion and the second light shielding portion are formed from a single member.

3. The image reading optical system according to claim 1, wherein the first light shielding portion is located closer to an optical path of the light incident on the first one of the imaging mirrors than the second light shielding portion, and
wherein a distance between the first light shielding portion and the first one of the imaging mirrors is greater than a distance between the second light shielding portion and the first one of the imaging mirrors.

4. The image reading optical system according to claim 1, wherein the second diaphragm that regulates light in the direction crossing the specific direction regulates the light in the direction crossing the specific direction using a projection projecting, from a side of an optical path of the light traveling from the first one of the imaging mirrors to the subsequent one of the imaging mirrors, toward the optical path, and
wherein, when an end pass plane that passes a free end portion of the projection and extends along an optical axis of incident light incident on the first one of the imaging mirrors is assumed, the first light shielding portion and the second light shielding portion are located in, of two opposing spaces with the end pass plane interposed therebetween, a space in which a base of the projection is located.

5. The image reading optical system according to claim 1, further comprising:
a plate member disposed to cross an optical path of the light traveling from the first one of the imaging mirrors to the subsequent one of the imaging mirrors, the plate member being disposed at an angle with respect to an optical axis of the light,
wherein at least one of the first and second light shielding portions is formed from the plate member.

6. The image reading optical system according to claim 5, wherein the plate member is disposed along an optical axis of light incident on the first one of the imaging mirrors, and/or disposed parallel to an optical axis of light emerging from the subsequent one of the imaging mirrors.

7. The image reading optical system according to claim 6, wherein the optical axis of the light emerging from the subsequent one of the imaging mirrors extends along the optical axis of the light incident on the first one of the imaging mirrors, and
wherein the plate member is disposed along both the optical axis of the incident light and the optical axis of the emerging light.

8. The image reading optical system according to claim 5, wherein the plate member has an opening that allows the light traveling from the first one of the imaging mirrors to the subsequent one of the imaging mirrors to pass therethrough, and
wherein the second diaphragm that regulates the light in the direction crossing the specific direction regulates the light in the direction crossing the specific direction using a projection projecting from an opening edge of the opening.

9. The image reading optical system according to claim 8, wherein the projection and the plate member are integrated with each other.

10. An image reading device, comprising:
a light source that emits light to illuminate a readable object; and
an image reading optical system that receives light from the readable object to read an image on the readable object, wherein the image reading optical system is the image reading optical system according to claim 1.

11. An image reading optical system, comprising:
- a sensor including an array of reading elements that read incident light;
- a plurality of imaging mirrors that reflect light traveling from a readable object to the sensor;
- a plate member that is disposed at an angle with respect to a travel direction of light traveling from a first one of the imaging mirrors to a subsequent one of the imaging mirrors to cross the light,
- wherein at least part of the plate member is disposed along light incident on the first one of the imaging mirrors;
- a first diaphragm that regulates light traveling from the first one of the imaging mirrors to the subsequent one of the imaging mirrors in a specific direction; and
- a second diaphragm that regulates, in a direction crossing the specific direction, the light traveling from the first one of the imaging mirrors to the subsequent one of the imaging mirrors with a projection projecting from the plate member.

12. The image reading optical system according to claim 11, wherein the plate member and the projection are integrated with each other.

13. The image reading optical system according to claim 11,
- wherein the plate member has an opening that allows the light traveling from the first one of the imaging mirrors to the subsequent one of the imaging mirrors to pass therethrough, and
- wherein a portion of the plate member around the opening regulates the light traveling from the first one of the imaging mirrors to the subsequent one of the imaging mirrors in the specific direction.

14. The image reading optical system according to claim 11, wherein the plate member is disposed along an optical axis of light incident on the first one of the imaging mirrors, and/or disposed along an optical axis of light emerging from the subsequent one of the imaging mirrors.

15. An image reading optical system, comprising:
- a sensor including a plurality of reading elements arranged in a first direction;
- a plurality of imaging mirrors that reflect light traveling from a readable object to the sensor;
- a first diaphragm that has a light receiving surface that receives part of light traveling from a first one of the imaging mirrors to a subsequent one of the imaging mirrors, the first diaphragm regulating the light in the first direction; and
- a second diaphragm that regulates the light traveling from the first one of the imaging mirrors to the subsequent one of the imaging mirrors in a second direction crossing the first direction, the second diaphragm including a first light shielding portion and a second light shielding portion disposed at different positions in a travel direction of the light to block part of the light, at least one of the first and second light shielding portions deviating from a plane passing the light receiving surface.

* * * * *